July 6, 1971

F. W. HARSTEIN 3,591,440

APPARATUS FOR MANUFACTURING A BIAXIAL
LAMINATED NONWOVEN FABRIC

Filed Jan. 22, 1969

INVENTOR
FRED W. HARTSTIEN

BY
Cushman, Darby & Cushman
ATTORNEYS

INVENTOR
FRED W. HARTSTEIN

BY
Cushman, Darby & Cushman
ATTORNEYS

INVENTOR
FRED W. HARSTEIN

BY
Cushman, Darby & Cushman
ATTORNEYS

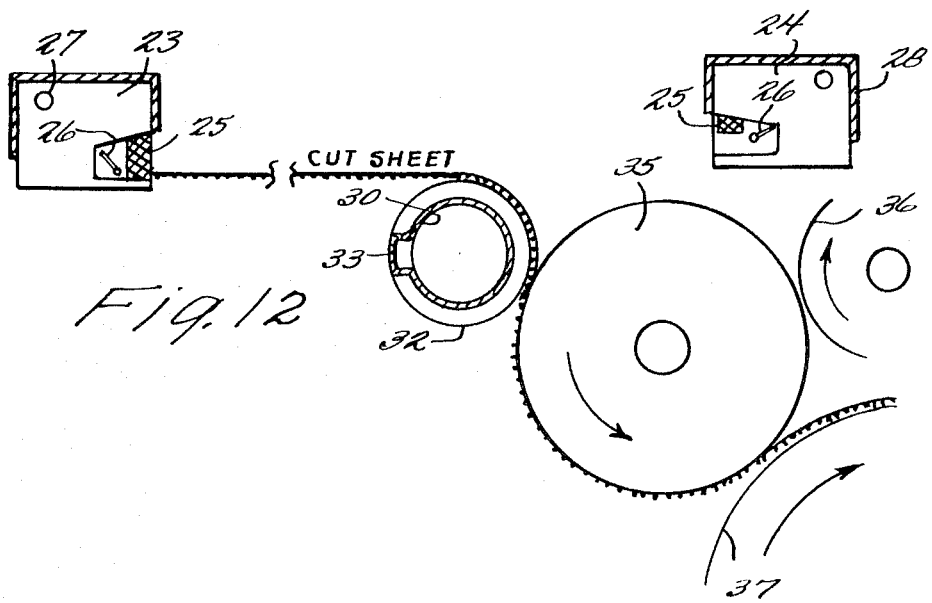
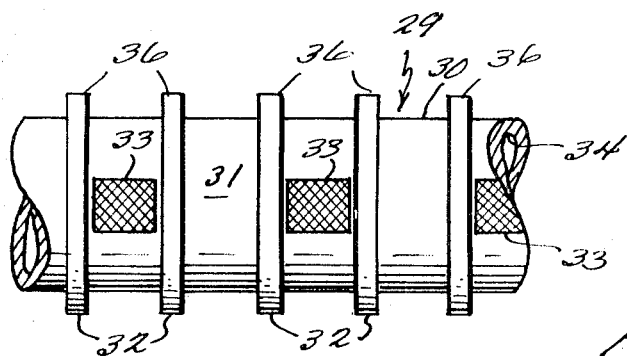
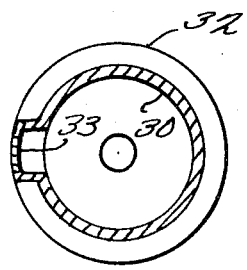

United States Patent Office 3,591,440
Patented July 6, 1971

3,591,440
APPARATUS FOR MANUFACTURING A BIAXIAL LAMINATED NONWOVEN FABRIC
Fred W. Harstein, Grottoes, Va., assignor to Swirltex, Inc., Grottoes, Va.
Continuation-in-part of application Ser. No. 662,070, Aug. 21, 1967. This application Jan. 22, 1969, Ser. No. 793,142
Int. Cl. B64h 61/00
U.S. Cl. 156—439                    1 Claim

ABSTRACT OF THE DISCLOSURE

An apparatus for the manufacturing of biaxial laminated nonwoven fabric which includes means for contacting one surface of a thermoplastic film with a plurality of substantially parallel yarns and means for applying sufficient heat and pressure thereto to bond said yarns to said one surface thereby producing a uniaxial laminate, means for severing a length of said uniaxial laminate means for contacting the yarn-free surface thereof with a plurality of substantially parallel yarns and means for applying sufficient heat and pressure thereto to bond said yarns to the yarn-free surface thereby producing a biaxial laminate, means for joining this biaxial laminate along one of its edges to one edge of another severed uniaxial laminate produced essentially as described above and means for contacting the yarn-free surface of said other severed uniaxial laminate joined to said biaxial laminate with a plurality of substantially parallel yarns and means for applying sufficient heat and pressure thereto to bond said yarns to said yarn-free surface thereof, thereby producing said biaxial laminated nonwoven fabric.

---

This application is a continuation-in-part of my application Ser. No. 662,070, now pending, filed Aug. 21, 1967.
This invention relates to an apparatus for producing biaxial laminated nonwoven fabric.

GENERAL DESCRIPTION OF THE INVENTION

The apparatus of this invention includes, in combination, means for continuously delivering a first plurality of yarns in substantially parallel relationship to each other to a first laminating means, means for continuously delivering a heat-softenable plastic film material to said first laminating means, said first laminating means comprising heated pressure roll means to produce a uniaxial laminate, means for withdrawing the uniaxial laminate from said first laminating means and delivering the same to a uniaxial laminate accumulator or storage means, said accumulator provided with means for sensing the amount of uniaxial laminate stored therein and means in response to the amount sensed therein for delivering a predetermined length of said uniaxial laminate to severing means for separating said predetermined length of uniaxial laminate from the uniaxial laminate stored in said accumulator, means for transferring said severed uniaxial laminate in a direction substantially normal to the direction in which said uniaxial laminate is deilvered to said severing means to second laminating means whereby a non-severed edge of the severed uniaxial laminate comprises the leading edge of said laminate being transferred to said second laminating means, means for continuously delivering a second plurality of yarns in a substantially parallel relationship to each other to said second laminating means for contact with the yarn-free surface of said uniaxial laminate, said second laminating means including means for joining the leading edge of said uniaxial laminate to the trailing edge of a previously formed biaxial laminate, and heated pressure rolls for adherng and laminating said second plurality of yarns to said yarn-free surface of the uniaxial laminate joined to said biaxial laminate to produce a biaxial laminated nonwoven fabric.

The preferred embodiments of the invention will be described in greater detail by reference to the accompanying drawings, in which:

FIG. 9 is a partial plan view of the vacuum transfer roll employed to transfer the severed uniaxial laminate to the second laminating means;

FIG. 10 is a sectional view taken along the line 10—10 of FIG. 9;

FIG. 12 is a schematic side view showing the position of the vacuum transfer roll and the uniaxial laminate edge grippers in relation to the second laminator at transfer of the uniaxial laminate thereto.

DETAILED DESCRIPTION OF THE INVENTION

Figure 1:
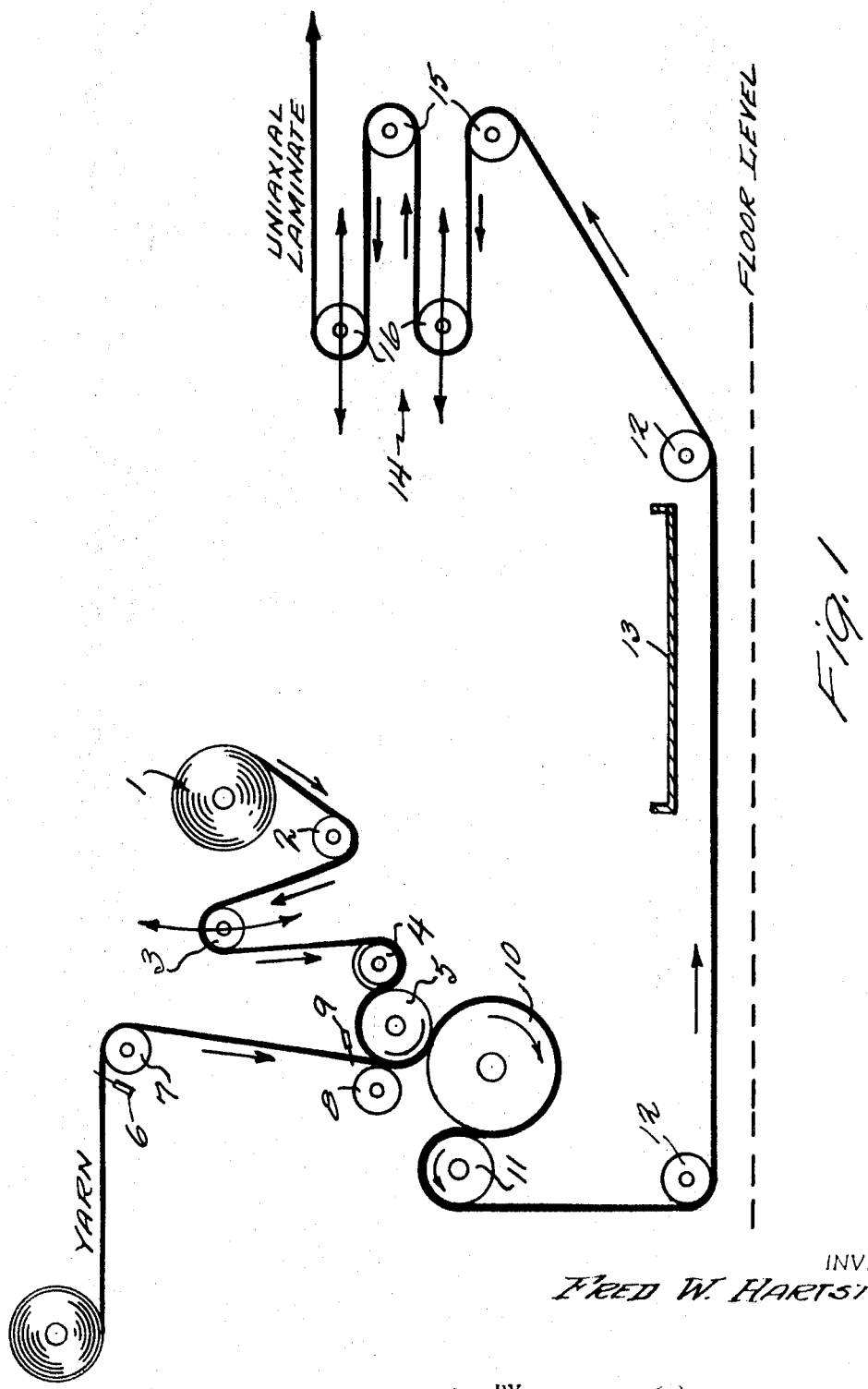
FIG. 1 is a schematic side view of the apparatus employed in conveying the yarn and heat-softenable synthetic plastic film to form a uniaxial laminate and to deliver the same to a uniaxial accumulator.

Referring to the drawings, the fabric is produced on the following apparatus:

In the first laminator means of this invention a self-supporting discrete thermoplastic film, which can be ethylene acrylic acid copolymer film (for example, Dow Chemical P.Z. 4,333.9 Experimental Film) of a thickness of one-half to one mil, is unwound from a spool 1 driven by a drive mechanism, not shown, and passes over idler rolls 2 and 3 and onto an elastomer covered idler roll 4 which transfers the sheet-adhesive smoothly and without trapped air pockets to heated roll 5. Idler roll 3 is free to move in a pivotal manner and pulls on the film with a constant force, independent of the position of the idler roll 3 in the pivotal arc. The force is supplied by an air cylinder (not shown) and is manually adjustable. Normally, the force is adjusted to give 1–5 ounces tension per inch of width. The position of the idler roll 3 proportionally determines the amount of braking torque applied of the spool 1 though electro-mechanical interconnection (not shown). The maximum braking torque is applied to spool 1 when idler roll 3 is in its uppermost position. This arrangement provides constant tension in the film or sheet-adhesive material to prevent wrinkles and distortion.

Simultaneously, yarn is fed, under typical tension of 1–8 ounces per inch, from a remotely located creel (not shown) and is spaced by a conventional textile industry comb 6, passed down toward the laminating zone over idler roll 7 and is brought into contact with the film or sheet-adhesive material between rolls 8 and 5 after being spaced again by similar comb means 9 which is positioned as close as possible to the point where yarn and sheet-adhesive are brought into contact with each other, thereby promoting uniform spacing of the yarn in the finished product. As noted above, the sheet-adhesive and the yarn are first brought into contact with each other between rolls 8 and 5. A slight bond is achieved at this point, due to the softening of the adhesive film by its contact with heated roll 5. As the slightly bonded laminate passes over heated roll 5 it is preheated and a stronger bond is achieved by passing the laminate between heated roll 5 and heated roll 10, the main laminating roll, which heats the laminate uniformly to the desired temperature. The desired degree of bonding is substantially achieved as the laminate passes between heated rolls 10 and 11, with the laminate being cooled slightly as it passes over roll 11 thereby preventing dissociation of the yarn from the sheet-adhesive. Rolls 5, 10 and 11 are heated by, for instance, circulating hot water or steam through central pipes or conduits therein. The temperature of roll 10 is, preferably, controlled independently of rolls 5 and 11, the temperature of roll 10 being just below that at which the sheet-adhesive would tear when pulled from the roll surface. The actual temperature, of course, will vary depending on the type and thickness of the sheet-adhesive used. Ordinarily, the temperature can vary between about 170 to 325° F. Rolls 5 and 11 are generally controlled or maintained at a temperature usually about 50° F. below the temperature of roll 10.

Rolls 5, 10 and 11 are synchronously geared together and driven by a variable speed drive means (not shown) which drive means, however, is independent of drive means provided to actuate the cut-off and side-feeding mechanism and the second laminator mechanism used in this invention.

Also rolls 3, 4, 5, 8 and 11 are independently pivotable by air cylinders (not shown) which permits a modification in the degree of engagement thereof with their corresponding operatively associated rolls for manually threading material in the first laminator mechanism for start-up purposes or for adjusting the force which operatively associated rolls exert on each other. Such forces are usually in the range of about 5 to 30 pounds per inch of width of the sheet-adhesive. In any event, the amount of force can vary depending on the materials being laminated, the temperature of the rolls 5, 10 and 11 and on the average speed at which the uniaxial laminate is being produced.

After the uniaxial laminate leaves roll 11, it passes under idler rolls 12, on operator's platform 13 which provides access to the sheet-adhesive spool 1 and to the accumulator 14. The temperature of the uniaxial laminate is generally lowered to ambient temperature during its passage over idler rolls 12 due to air-cooling. Accumulator 14 comprises one or more idler rolls 15 which preferably are vertically aligned and one or more idler rolls 16, which are also preferably vertically aligned with respect to each other and which are longitudinally spaced from idler rolls 15. Idler rolls 15, preferably, are restrained from longitudinal movement but idler rolls 16 are free to move longitudinally and pull against the uniaxial laminate with a constant, position independent force which is supplied by air cylinders (not shown) and which can be manually adjusted. As the uniaxial laminate is being accumulated, rolls 16 can move away from rolls 15 in the direction of the solid arrows shown in FIG. 1. During transfer of the uniaxial laminate from the accumulator 14 to the cut-off and side-feeding mechanism, the rolls 16 move towards rolls 15. Generally the amount of uniaxial laminate which is accumulated for periodic discharge is about 1⅓ times the maximum sheet length produced in the cut-off and side-feeding mechanism.

There is also provided, in association with the idler rolls 16, sensing means actuated by the idler rolls 16. In response to said sensing means, the drive means for the uniaxial laminator is slowed down and finally stopped when the accumulator has stored its full capacity for the uniaxial laminate. The sensing means can comprise, for instance, limit switches or photo-electrical devices mounted in the accumulator section to detect the desired degree of capacity of uniaxial laminate stored therein. The sensing means are operatively connected to the drive means of the uniaxial laminator whereby in response to the capacity sensed in the accumulator, the drive means can be slowed down, for instance, when the accumulator is about 80 to 85% full. The sensing means can also be operatively connected to the drive means (not shown) of the sheeting means to prevent withdrawal of uniaxial laminate stored in the accumulator and delivery thereof to the sheeting means unless the accumulator contains, for instance, uniaxial laminate in amounts of about 75% of its storage capacity for the laminate.

The sensing means is also operatively connected to control means which establishes the overal synchronous line speed of the uniaxial laminator means, the sheeting means and the biaxial laminator means. Thus the apparatus of this invention includes an overall speed control means which is triple cascaded, that is, has three speed adjustments, each successive adjustment selecting a fraction of the speed set by the previous adjustment. The first of these adjustments is, as stated above, a control means which established the overall synchronous line speed of the two laminator means and the sheeting section means, the second of the adjustments establishes the speed of the uniaxial laminator means relative to the sheeting section means and the third adjustment establishes the actuation of the drive means of the uniaxial laminator relative to the amount of uniaxial laminate stored in the accumulator associated therewith.

Sheeting means 17 is shown schematically in FIGS. 2–8, the actuation of which provides a series of sequential operations programmed into the drive mechanism (not shown) thereof by a stepping sequence controller (also not shown). As each step in the sequence is completed, sensing means operatively associated with the sheeting means 17 detect the completion of the step and cause the stepping sequence controller to initiate the next step in the programmed sequence. The sensing means is usually a limit switch or photo-electric device attached to the sheeting means in a predetermined position. The sheeting drive mechanism comprises a train of gears, drive belts, electric clutches and brakes, with power being supplied thereto by, for instance, a single, variable speed drive motor.

Operatively connected to the sheeting drive mechanism is one of rolls 17 and 18 which pull the uniaxial laminate, yarn side down, from the accumulator 14. Rolls 17 and 18 are internally water cooled, upper roll 17 being covered with an elastomer material and being pivotable, for instance, by air cylinders. Lower, steel-faced roll 18 is driven by the drive mechanism and rolls 17 and 18 engage each other with sufficient force to prevent slippage of the uniaxial laminate between them.

Figures 4, 5:
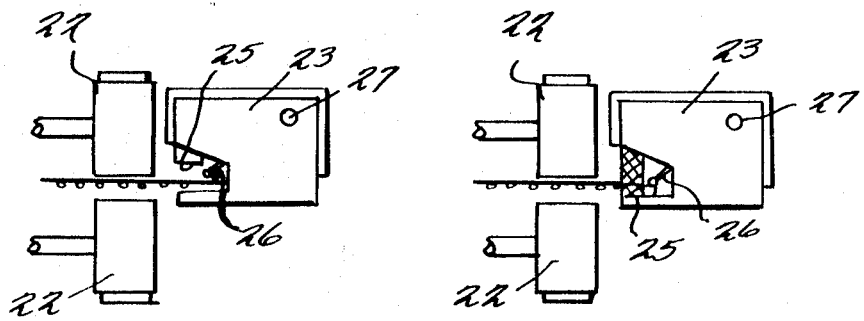
FIG. 4 is a sectional view taken along the line 4—4 of FIG. 3, with the transfer belt means in the closed position and the uniaxial laminate edge gripeprs in the open position.
FIG. 5 is a sectional view taken along the line 5—5 of FIG. 3 with the transfer belt means in the closed position and the uniaxial laminate edge grippers in the closed position.

The uniaxial laminate withdrawn from accumulator 14 by rolls 17 and 18, passes between compressed air-actuated cut-off knives 19, sheet-metal guide plates 20 and then between a plurality of sets of endless belts 21, 22. Preferably, about 5 sets of such belts, each about 3 inches wide are employed. Each set of endless belts is arranged to firmly grasp the incoming uniaxial laminate between them. The two outermost endless belt sets 22 are positioned to allow the edges of the uniaxial laminate to extend beyond the edge of the belts, generally about 1.5 inches, as shown in FIG. 5. As the uniaxial laminative is withdrawn from the accumulator 14, the laminate overhanging the edge of the belts 22 is positioned by the moving belts, between the open jaws of the edge-gripping means 23, 24 which are spaced at about 6 inch intervals.

During this step, the sets of endless belts 21 and 22 are synchronized to run at the same surface velocity as rolls 17 and 18.

The uniaxial laminate is continued to be withdrawn by rolls 17 and 18 from accumulator 14 until a predetermined length thereof, equal in length to the desired width of biaxial laminate, has passed between cut-off knives 19 at which time, rolls 17 and 18 and belts 21 and 22 are braked to a stop. The knives 19 are then actuated to sever the desired length of uniaxial laminate to form a cut sheet which typically can have a length of about 7 feet.

In the next step, the five sets of endless belts are actuated to transport the cut sheet away from the cut-off knives 19 and to center the cut sheet with respect to the sheeting means 17. When so centered, travel of the endless belts is ceased. Ordinarily, it has been found convenient to horizontally displace the cut sheet about one foot from the cut-off knives.

The next series of sequentially performed operations effect precise sensing and alignment of the edges of the cut sheet in the sheeting means. Since the uniaxial laminate can be easily stretched or deformed it has been found that when it is withdrawn from the accumulator and as it travels over the sets of endless belts, the laminate often experiences a change in its width. Accordingly, prior to being delievered into the biaxial laminator means, the edges of the cut sheet must be accurately aligned. At the initiation of the sequential operations to effect this alignmen, the edge of the uniaxial laminate is positioned in the open jaw of the edge grippers 23, 24 as shown in FIG. 4 where the gripper jaw 25 and edge sensor means 26 are in a raised position. The jaws 25 and sensors 26 are then lowered to rest lightly on the cut sheet with a force of only a few ounces as shown in FIG. 5. This motion is accomplished by the slight rotation of shafts 27 and 28 passing through all the grippers 23 and 24, respectively.

Figure 6:
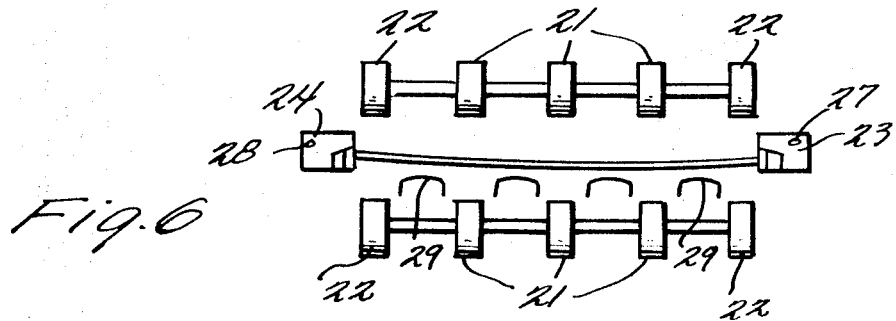
FIG. 6 is an end view of the apparatus of FIG. 3 with the transfer belts in the open position and the uniaxial laminate edge grippers in the closed position prior to delivery and transfer of the uniaxial laminate to the second laminating means.

In the next step, the sets of endless belts 21 and 22 are vertically separated as shown in FIG. 6 with the belts on each side of the cut sheet being moved as a unit by air cylinders. The belts 21 and 22 are sufficiently vertically removed from the cut sheet to allow passage of the grippers 23 between them during a subsequent operation which entails the transfer of the cut sheet to the biaxial laminator means. Sheet metal supports 29 are provided, as shown in FIG. 6, to support the cut sheet when the sets of endless belts are separated.

Figure 3:
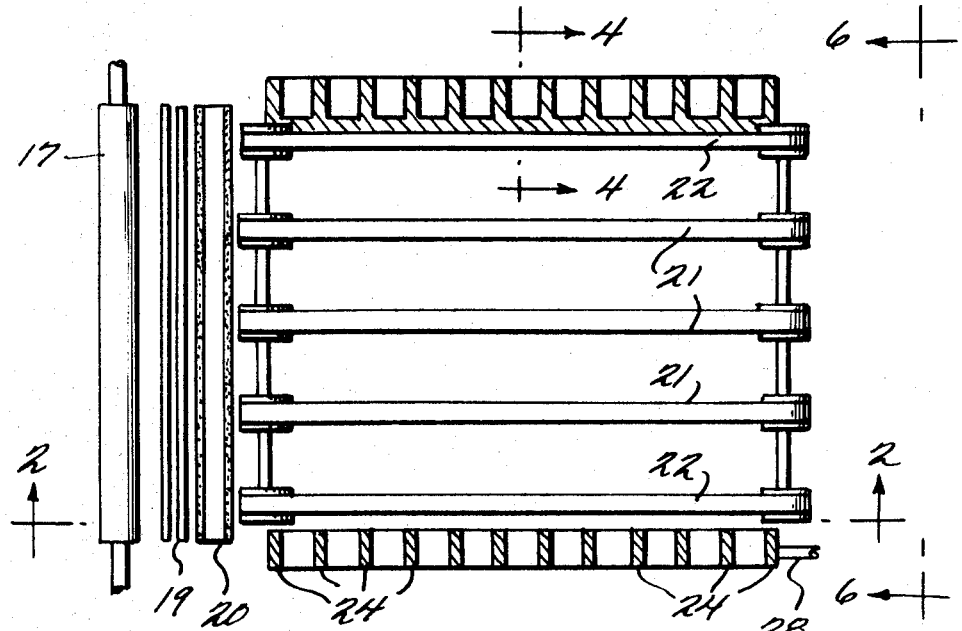
FIG. 3 is a plan view of the apparatus shown in FIG. 2.

In the next operation, the grippers 24 are activated whereby they move, as a unit, in a direction defined by the arrow in FIG. 3, for a short pre-set distance and the edges of the cut sheet are slid slowly out from under the gripper jaws 25 and edge sensor means 26 of edge grippers 23 and 24. As the yarn on the edges of the cut sheet slides out from under the edge sensor means 26 in each of the grippers 23 and 24, the sensor means 26 triggers a fast-acting electrically operated spring release means (not shown) which releases a spring held in the biased or constrained position to engage the gripper jaws 25 and apply thereto a force of sufficient magnitude, generally about 5 to 10 lbs./sq. in. to urge the gripper jaws 25 into tighter gripping engagement with the edge of the cut sheet as shown in FIG. 6. The distance that the edge grippers 24 move toward the biaxial laminator means is pre-set such that all of the edge grippers are triggered during this operation and the cut sheet is stretched slightly to eliminate any wrinkles therein. At the end of this operation, both sets of edge grippers 23 and 24 move at a much higher speed in the direction of the arrow shown in FIG. 3 toward the biaxial laminator section, carrying between them the cut sheet.

The sequence of operations just described occurs generally in about 4 seconds while the sequence of operations about to be described generally occurs in about 6 seconds for a total cycle rate of about 6 per minute at maximum operating speed.

The next operation is concerned with transferring the cut sheet to the laminating rolls of the biaxial laminating section.

Figure 7:
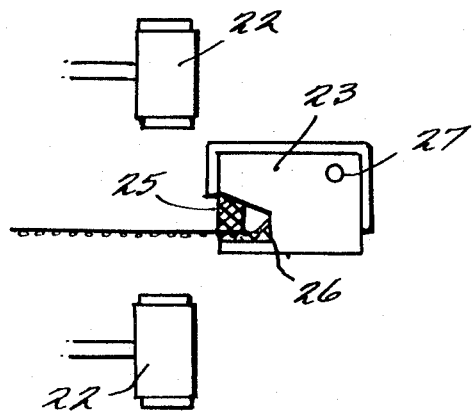
FIG. 7 is a partial exploded view of the right hand portion of FIG. 6.
Figure 8:
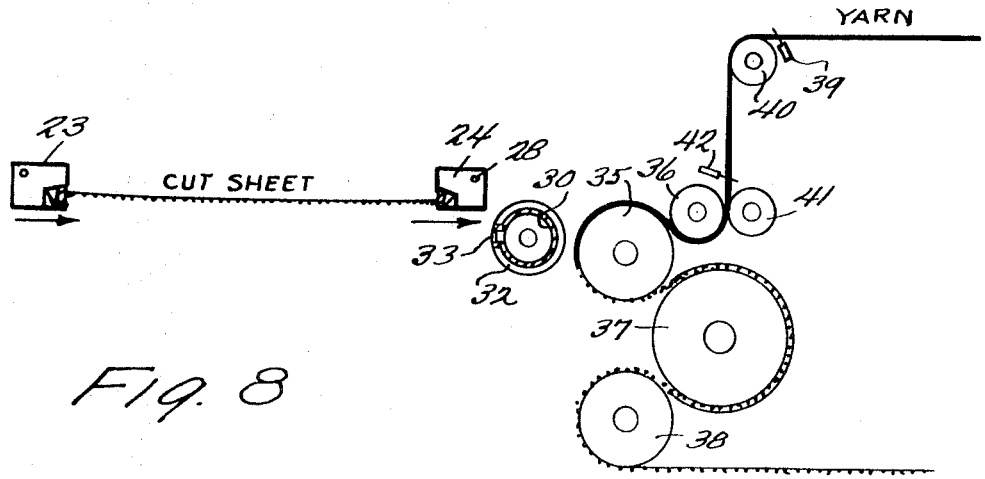
FIG. 8 is a schematic view of the apparatus for delivering the severed uniaxial laminate to the second laminating means.

From sheeting means or section 17, as the edge grippers 23 and 24 move towards the biaxial laminating section, carrying the cut sheet between them as shown in FIG. 7, the cut sheet approaches a rotatable vacuum transfer roll 29 shown in FIGS. 8 and 9. The vacuum transfer roll 29 comprises a hollow cylindrical tube 30, suitably journalled at its ends for rotational movement and provided, on its outer peripheral surface 31, with evenly spaced ball bearings 32 which extend radially outwardly from the peripheral surface 31 of the tube 30. Generally the outside diameter of the bearings 32 is about one inch greater than the outside diameter of the tube 30. Between pairs of ball bearings 32 there is provided vacuum pads 33 which communicate with the hollow interior 34 of the transfer roll 29. The vacuum pads 33 can be fabricated from a porous material such as porous sintered metal to allow the vacuum to reach the surface yet contain the vacuum. The outer surface of these vacuum pads 33 is coplanar with the outer peripheral surface 30 of the tube 31.

As the edge grippers 24 move in the direction of the vacuum transfer roll 29, the vacuum transfer roll is maintained in a stationary position with the vacuum pads positioned in a direction facing the sheeting section or means 17. The vacuum transfer roll 29, during this phase of the operation, has been pivoted by air cylinders (not shown) away from yarn roll 35 of the biaxial laminator means.

After movement of the edge grippers 23 and 24 a predetermined distance from the vacuum transfer roll 29, the vacuum transfer roll is caused to be engaged to the drive mechanism of the biaxial laminator means through a one-revolution clutch mechanism (not shown) and is rotated at a rate sufficiently such that the vacuum pads 33 are moving at the same surface velocity as the edge grippers 23 and 24. Simultaneously, cooperating valve means are actuated to the open position by a sequence controller means to admit vacuum to the vacuum transfer roll 29. The motions of the vacuum transfer roll 29 and the edge grippers 23 and 24 are synchronized such that the vacuum pads 33 will be positioned to be covered by the edge of the cut sheet as the edge grippers 24 move into a position over the vacuum transfer roll 29 and into superposed engagement with the outer peripheral surface 36 of the ball bearings 32 as shown in FIG. 10.

Figure 11:
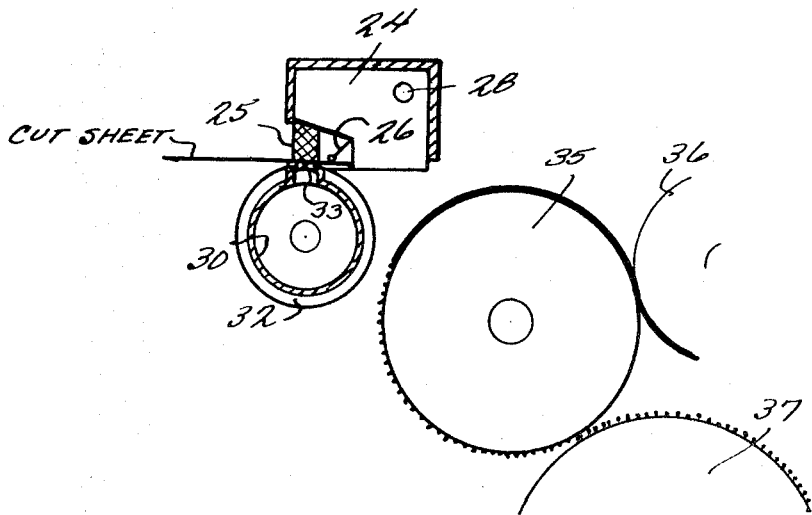
FIG. 11 is a schematic side view showing the position of the vacuum transfer roll just prior to transfer of the laminate to the second laminator.

The edge of the cut sheet is thus held by the vacuum pads 33 at regularly spaced intervals between the edge grippers 24. The gripper jaws 25 of edge grippers 24 are released from engagement with the edge of the cut sheet by clockwise rotation of shaft 28 in response to a signal received from the sequence controller. The cut sheet, edge grippers 23 and the vacuum transfer roll 29 continue to move at a steady synchronized velocity and the edge grippers 24 come to rest in a waiting position above yarn roll 35 as indicated in FIG. 11.

When the vacuum transfer roll 29 has carried the edge of the cut sheet to a position immediately opposite the edge of a previously cut sheet positioned on the peripheral surface of yarn roll 35, the sequence controller is activated to initiate a rapid sequence of four operations. The vacuum transfer roll 29 is pivoted into pressing engagement with the yarn roll 35, the vacuum to vacuum transfer roll 29 is discontinued or broken, a short blast of compressed air is injected to the interior of the vacuum transfer roll 29 from a suitable source (not shown) to release the cut sheet from the vacuum pads 33 and the biaxial laminating rolls 35, 36, 37 and 38 are caused to engage the drive mechanism (not shown) of the biaxial laminator means.

On transfer of the cut sheet from the vacuum transfer roll 29 to the yarn roll 25, the ball bearings 32 causes a slight bond to occur with the yarn-free face of the cut sheet and the yarn present on the yarn roll 35. The vacuum tube 30 and vacuum pads 33 continue to rotate one full revolution thereby returning to their original position prior to the transfer of the cut sheet to yarn roll 35, i.e. with the vacuum pads 33 facing in the direction of the sheeting section whereupon the tube 30 and vacuum pads 33 come to a rest while, at the same time, the ball bearings 32 continue to rotate thereby bonding the yarn and cut sheet positioned between the barings 32 and the yarn roll 35, as seen in FIG. 11, rolls 35, 36, 37 and 38 rotating in the direction indicated by the arrow associated with each.

As the cut sheet is being transferred from the vacuum transfer roll 29 to the yarn roll 35, the edge grippers 23 continue to move towards the biaxial laminator section until the edge grippers 23 reach a predetermined position ahead of the vacuum transfer roll 29, generally a distance of a few inches. At this time the vacuum transfer roll 29 is again caused to be engaged to the biaxial laminator drive mechanism through the one revolution clutch mechanism and, simultaneously, a vacuum is created within the transfer roll 29 through an automatically controlled valve means (not shown). The tube 30 together with the vacuum pads 33 rotate until the pads 33 are positioned under the trailing edge of the cut sheet to hold the same while the edge grippers 23 carry the trailing edge of the cut sheet in their travel through the space defined by those pairs of ball bearings 32 not provided with vacuum pads 33. As the trailing edge of the cut sheet is being held by the vacuum pads 33, the sequence controller senses the position of the trailing edge and in response thereto, edge grippers 23 are activated to release the trailing edge of the cut sheet by rotation of shaft 27 after a momentary hesitation to allow the trailing edge of the cut sheet to be pulled from the gripper jaws 25 by rotation of the vacuum transfer roll 29.

Figure 2:
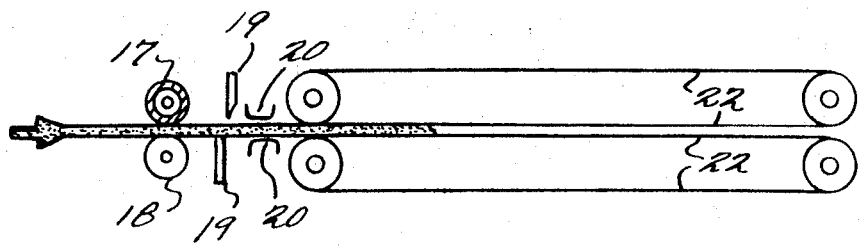
FIG. 2 is a side view of the apparatus shown in FIG. 3 prior to severing a predetermined length of uniaxial laminate delivered from and stored in the uniaxial laminate accumulator.

On withdrawal of the trailing edge of the cut sheet from the gripper jaws 25, the leading edge of the cut sheet is transported by the vacuum transfer roll 29 adjecent the point of tangency between the vacuum transfer roll 29 and the yarn roll 35 at which time the following sequential operations are initiated. The rotation of each of biaxial laminator rolls 35, 36, 37 and 38 is stopped, the valve communicating with the interior of the vacuum transfer roll for creating the vacuum therein is closed, compressed air is introduced into the hollow interior of vacuum transfer roll 29 to effect the release of the trailing edge of the cut sheet from the vacuum pads 33, the vacuum transfer roll is moved out of engagement with yarn roll 35, generally a distance of about 0.05 inch, the edge grippers 24 are caused to move in their respective tracks rearwardly toward the sheeting section and the upper and lower portions of the sets of endless belts 21 and 22 are moved vertically toward each other until they are in the closed position as shown in FIG. 2.

At the completion of this sequence of operations the tube 30 and the vacuum pads 33 continue to complete one full revolution at the end of which the vacuum pads 33 are positioned in a direction facing the sheeting section. The edge grippers 23 continue in their rearward movement in their respective tracks (not shown) to their original position as shown in FIG. 3. While edge grippers 23 and 24 are moving to their original position the cycle beginning at least with the removal of a portion of uniaxial laminate from the accumulators and its delivery to the sheeting section is repeated in the sequence described above.

When the leading edge of the cut sheet is transported by the vacuum transfer roll 29 adjacent the point of tangency between the vacuum transfer roll 29 and the yarn roll 25, the leading edge of the cut sheet is bonded to the trailing edge of the previously cut and transferred adhesive sheet, essentially at this point of tangency between rolls 29 and 35. After completion of the sequence of operations described above wherein the endless belts 21 and 22 are brought together in a closed position, the biaxial laminator rolls are again caused to engage the drive mechanism of the biaxial laminator.

At this time yarn is delivered to the biaxial laminator section under a typical tension of 1–8 ounces per end from a remotely located creel (not shown) the yarn being spaced uniformly by comb means 39 and being passed over idler roll 40. From roll 40 the yarn passes between roll 35 and idler roll 41 after again being uniformly spaced by comb means 42.

Comb means 42 is physically located as near as possible to the point where the yarn is introduced between rolls 36 and 41 which are pressed together by air cylinders with a force of about 5–10 pounds per lineal inch of roll face. Rolls 36 and 41 can be separated for threading new yarn between them in startup procedures. A heating medium, such as hot water, is circulated through roll 36 by any convenient means such as banks of tubes housed therein and connected by any suitable means to a source of heating medium. The heating medium is circulated through roll 36 to preheat the yarn to a temperature where it will form at least a weak bond with the cut sheet.

After passing between roll 36 and roll 41, the yarn passes around roll 36 and then between roll 36 and roll 35 which are pressed against each other by air cylinders with a force of about 5–10 pounds per lineal inch of roll face. Rolls 35 and 36 can also be separated from each other for start-up operations and generally roll 35 is maintained essentially at the same temperature as roll 36 by circulating a heating medium such as hot water, therethrough, again in any convenient manner. Heating of roll 35 also facilitates an initial bonding of the leading edge of the cut sheet with the trailing edge of a previously cut sheet adjacent the point of tangency of vacuum transfer roll 29 and roll 35.

The yarn is brought into contact with the yarn-free face of the cut sheet transferred from the sheeting section on roll 35 to form the biaxial laminate which then passes between rolls 35 and 37 and then between rolls 37 and 38. Roll 37 can be steam heated to a temperature sufficiently high to soften or melt the adhesive sheet to form the desired final bond strength with the yarn. Roll 38 is maintained generally at the same temperature as rolls 35 and 36 by circulating a heating medium, such as hot water, therethrough. Ordinarily, roll 37 is about 75 to 100 degrees Fahrenheit hotter than rolls 35, 36 and 38. Rolls 35 and 37 and rolls 37 and 38 are pressed together by air cylinders with a force of typically 5–30 pounds per lineal inch of roll face and can be separated for start-up procedures. The final bond between the three layers comprising the biaxial laminate is accomplished between rolls 37 and 38, after which the laminate is cooled slightly as it passes around roll 38 for delivery to a take-up device or spool (not shown).

What is claimed is:

1. Apparatus for continuously manufacturing a biaxial laminated nonwoven fabric comprising in combination
    (a) means for continuously delivering a first plurality of yarns in substantially parallel relationship to each other to a first laminating means,
    (b) means for continuously delivering a heat-softenable plastic film material to said first laminating means,
    (c) said first laminating means comprising driven heated pressure roll means,
    (d) means for withdrawing the uniaxial laminate from said first laminating means and delivering the same to a uniaxial laminate accumulator means,
    (e) said accumulator means provided with means for sensing the amount of uniaxial laminate stored therein and means in response to the amount sensed therein for regulating said driven heated pressure roll means of said first laminating means and for regulating the delivery of a predetermined length of said uniaxial laminate to severing means for separating said predetermined length of uniaxial laminate from the uniaxial laminate stored in said accumulator, (f) means for transferring to a second laminating means said predetermined length of severed uniaxial laminate in a direction substantially normal to the direction in which the uniaxial laminate is delivered to said severing means whereby a non-severed edge of the predetermined length of severed uniaxial laminate comprises the leading edge of said length of severed uniaxial laminate being transferred, (g) means for continuously delivering a second plurality of yarns in a substantially parallel relationship to each other to said second laminating means for contact with the yarn-free surface of said length of uniaxial laminate, (h) said second laminating means including means for joining the leading edge of said severed length of uniaxial laminate to the trailing edge of a previously formed length of biaxial laminate and heated pressure roll means for adhering and laminating said second plurality of yarns to said yarn-free surface of the length of uniaxial laminate joined to said previously formed length of biaxial laminate to produce a biaxial laminated nonwoven fabric.

References Cited

UNITED STATES PATENTS

| | | | |
|---|---|---|---|
| 1,299,237 | 4/1919 | Scherf | 156—436 |
| 1,333,718 | 3/1920 | Jackson, Jr. | 156—436 |
| 1,383,243 | 6/1921 | Schwartz | 156—439 |
| 1,472,021 | 10/1923 | Jackson et al. | 156—439 |
| 1,850,301 | 3/1932 | Gibbs | 156—139 |

FOREIGN PATENTS

| | | | |
|---|---|---|---|
| 636,985 | 2/1962 | Canada | 156—436 |
| 777,734 | 6/1957 | Great Britain | 156—439 |

BENJAMIN R. PADGETT, Primary Examiner

B. H. HUNT, Assistant Examiner

U.S. Cl. X.R.

156—436, 437